Figure 1:
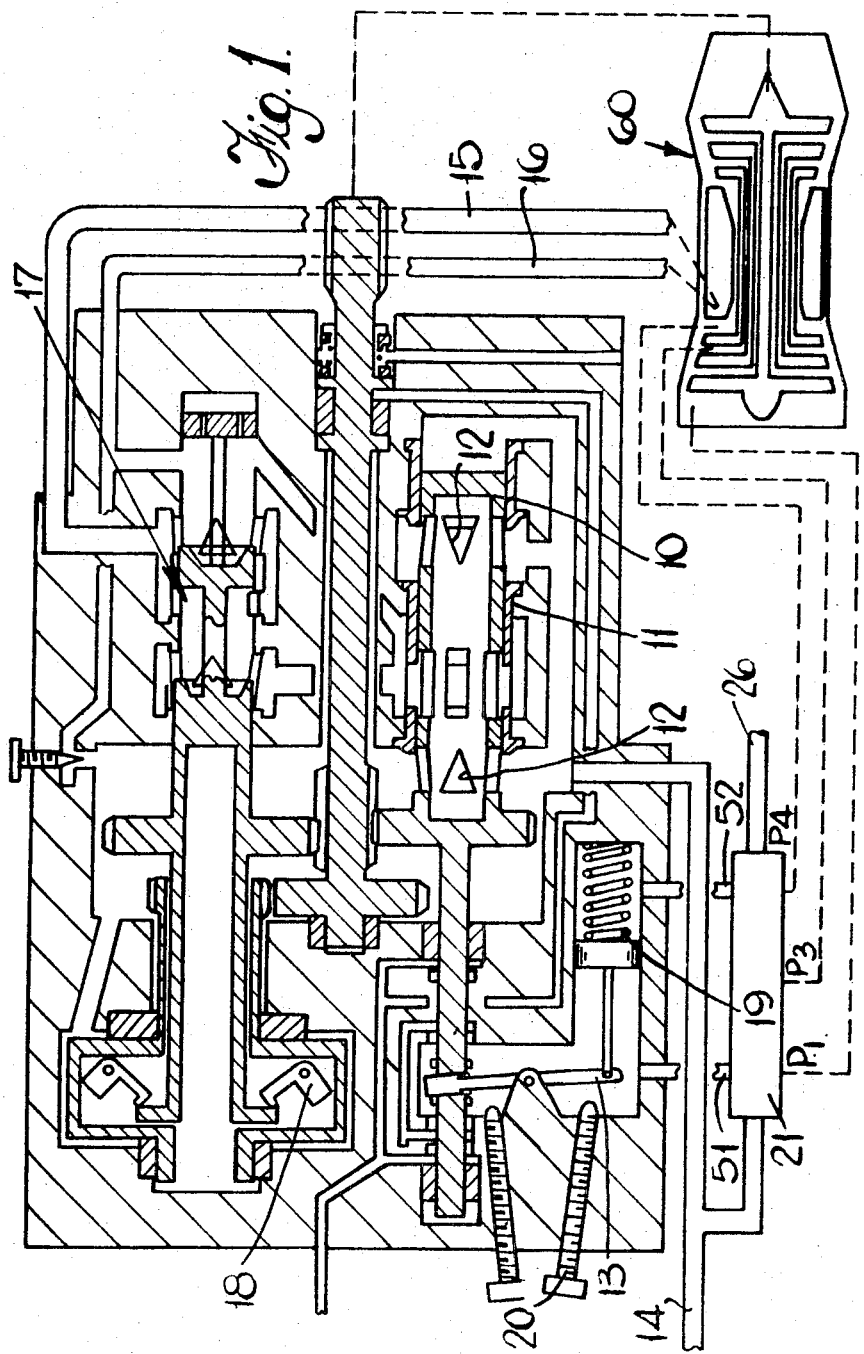

United States Patent
Ifield

[15] 3,662,546
[45] May 16, 1972

[54] FLUID PRESSURE ACTUATED DEVICE AND A GAS TURBINE FUEL CONTROL SYSTEM INCORPORATING SUCH DEVICE

[72] Inventor: Richard Joseph Ifield, New South Wales, Australia

[73] Assignee: Joseph Lucas (Industries) Limited, Birmingham, England

[22] Filed: Aug. 19, 1970

[21] Appl. No.: 65,008

[52] U.S. Cl. ............................................. 60/39.28, 60/39.16
[51] Int. Cl. .......................................................... F02c 9/08
[58] Field of Search .................................................. 60/39.28

[56] References Cited

UNITED STATES PATENTS 3,394,721   7/1968   Ifield ................................. 60/39.28
3,508,396   4/1970   Ifield ................................. 60/39.28

Primary Examiner—Clarence R. Gordon
Attorney—Holman & Stern

[57] ABSTRACT

A fuel control system for a gas turbine engine has a metering valve positioned by a control fluid pressure from a device actuated by fuel pressure in response to air pressure signals obtained from the engine compressor. These pressure signals are applied to bellows units which operate through linkages to vary the effective areas of flow restrictions and thereby to provide variations in the control pressure.

12 Claims, 2 Drawing Figures

3,662,546

FLUID PRESSURE ACTUATED DEVICE AND A GAS TURBINE FUEL CONTROL SYSTEM INCORPORATING SUCH DEVICE

This invention relates to a fluid pressure actuated device and a gas turbine fuel control system incorporating such a device.

It has been proposed in gas turbine fuel system to actuate a fuel metering flow regulator by an air pressure signal derived from air tappings in the compressor of the engine. The air pressure signal is derived by causing air to flow from one tapping to another through a system of orifices, one of which is variable by a throttle control. With this arrangement, however, difficulties arise when the air taken from the compressor tappings is contaminated since blockage of the orifices can occur.

The present invention has for its object to eliminate the orifice system and utilize only static air pressure signals.

In accordance with the invention there is provided a fluid pressure actuated device for incorporation in a gas turbine engine fuel control system, such device comprising a housing, a chamber within the housing first and second pressure sensing cells in said chamber, each of which cells is contractible by increase of a first air pressure signal applied to the interior of the chamber, the first cell having an inlet whereby a second air pressure signal can be applied to its interior and having one of its ends fixed within the housing, and the interior of the second cell being evacuated, a first lever in the housing pivotable about an axis at one ot its ends, pivotal connections being formed between the other end of the first cell and the first lever and one end of the second cell and the first lever, said pivotal connections being arranged at spaced positions along the first lever, a second lever pivotally mounted at one of its ends within the chamber and pivotally connected to the other end of the second cell, a third lever pivotally mounted in the chamber, a link interconnecting the second and third levers, an abutment associated with the first lever arranged to engage the third lever when the ratio of the second air pressure signal to the first air pressure signal is in excess of a value determined by the geometry of the lever/link system and an abutment in the chamber engageable by the first lever when said ratio is below said value, whereby the torque applied to said third lever is a function of both pressure signals when said ratio exceeds said value and a function of said first pressure signal only when said ratio is below said value.

Figure 2:
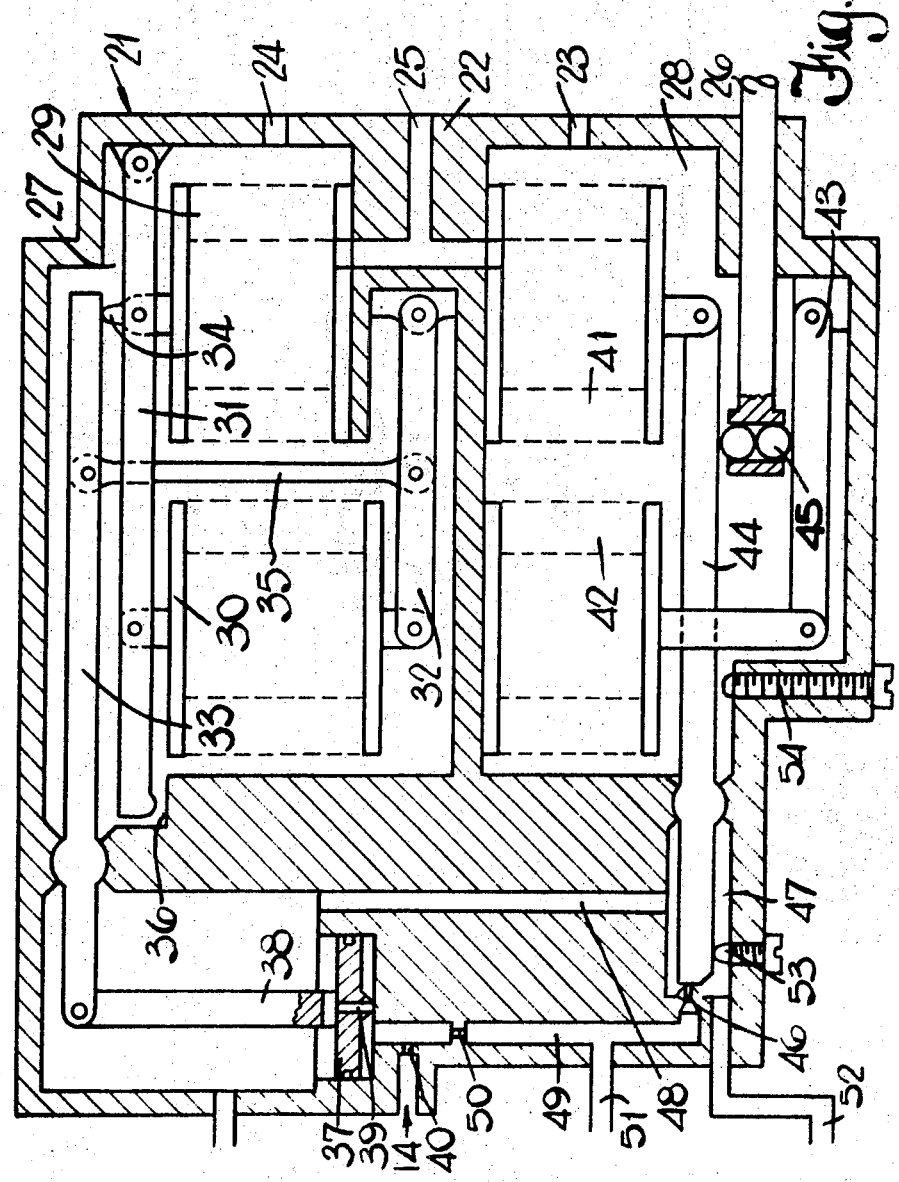

The invention also resides in a gas turbine engine fuel control system incorporating a device as defined above. An example of the invention is illustrated in the accompanying drawings in which:

FIG. 1 is a diagrammatic representation of part of a fuel control system in accordance with the invention; and FIG. 2 is a diagrammatic section through a fluid pressure actuated device incorporated in the system of FIG. 1.

Referring firstly to FIG. 1 the system includes a metering valve 10 which is rotatable in a bearing sleeve 11. The valve 10 has two triangular metering orifices 12 which co-act with the sleeve on axial displacement of the valve 10 by a lever 13 to control the flow of fuel from a high pressure supply line 14 to two output lines 15, 16 respectively connected to the main burner manifold and the pilot burner manifold of the associated engine 60.

The pressure drop through the valve 10 is controlled by a pressure drop unit 17 which incorporates a valve similar to the valve 10 but urged axially in one direction by a governor 18 and by the output fuel pressure and in the other direction by the high inlet pressure.

The lever 13 is positioned by an hydraulic piston/cylinder unit 19 which is spring loaded to urge the valve 10 towards a minimum fuel flow position defined by a stop 20. The pressures applied to opposite sides of the piston of the unit 19 are controlled by an air control device 21 which is shown in detail in FIG. 2.

The air control device 21 comprises a housing 22 which has three inlets 23, 24 and 25. These are connected respectively to tappings in the compressor of the engine, which is a three spool engine. Inlet 23 is connected to the compressor intake tapping ($P_1$), inlet 24 is connected to a tapping on the delivery side of the second compressor stage ($P_3$) and inlet 25 is connected to a tapping on the delivery side of the final compressor state ($P_4$). There is also a mechanical input to the device 21 such input being represented by longitudinal movement of a throttle link 26.

The housing 22 contains two air chambers 27 and 28 with which the inlets 24 and 23 communicate respectively. Mounted in the chamber 27 are two fluid pressure sensing cells in the form of resilient bellows 29, 30. The bellows 29 is anchored at one end of the housing and its interior communicates with the inlet 25. The other end of the bellows 29 is pivotally connected to a lever 31 which is pivoted at one end to the housing 22. As will be evident from the drawings pressure in the chamber 27 will tend to contract the bellows 29 thereby applying a force to lever 31 tending to turn it in an anticlockwise direction. Pressure within the bellows tends to turn the lever 31 in a clockwise direction.

The bellows 30 is evacuated and is pivotally connected at one end to a second lever 32 which is pivoted at one end to the housing. The other end of the bellows 30 is pivotally connected to the lever 31 at a position on the side of the pivotal connection between lever 31 and bellows 29 remote from the pivotal mounting of the lever 31 on the housing 22.

There is a third lever 33 pivotally mounted in the housing. This lever 33 is engageable by an abutment 34 associated with the first lever 31. In fact this abutment is, in the example described, attached to the bellows 29 but it will be appreciated that the abutment 34 could be situated at a different position on the lever 31 if required for any specific application. A link 35 is pivotally connected at its ends to the levers 31 and 33 respectively.

An abutment 36 in the housing is engageable by the free end of the lever 31 when the anticlockwise moments of the forces applied to this lever by the bellows 29, 30 resulting from the air pressure signal $P_3$ exceed the clockwise moment of the force applied thereto by the bellows 29 as a result of the air pressure signal $P_4$. It will be appreciated from consideration of the geometry of the arrangement that this condition will occur when the ratio $P_4:P_3$ is below a predetermined value.

When this ratio exceeds this value the anticlockwise moment of the forces applied to the lever 33 by the link 35 and the abutment 34 can be expressed as follows:

$$G = K((P_4 - a\,P_3) + b\,P_3)$$

where $K$ is a constant, a is the predetermined value of said ratio and b is a constant determined by the geometry of the linkage.

When the ratio is less than $a$, the anticlockwise moment of the lever 33 by the link 35 (the abutment 34 being out of engagement with the lever 33) is given by:

$$G = KbP_3$$

A piston 37 slidable in a cylindrical bore in the housing is arranged to supply a force for counterbalancing the anticlockwise moment on the lever 33. The piston 37 has a piston rod 38 pivoted to the lever 33 on the side of its pivot axis remote from the link 35 and the abutment 34. The piston has an orifice 39 the effective area of which is dependent on the proximity of the piston to the base of the bore in which the piston slides. The piston is exposed on its side nearer the lever 33 to a low fuel pressure and the bore is connected via a flow restrictor 40 to the high pressure fuel line 14. It will be appreciated that the fuel pressure in the bore will be dependent upon the spacing of the piston from the base of the bore and the piston will, in fact, always take up a position such that this fuel pressure exerts the required counterbalancing pressure on the lever 33.

The chamber 28 contains a further pair of bellows 41 and 42 respectively. The interior of the bellows 41 communicates with the $P_4$ inlet 25 and the bellows 42 is evacuated. The bellows 42 is pivoted to a lever 43 pivoted in the housing to turn this lever in a clockwise direction as $P_1$ rises. The bellows 41 is pivoted to another lever 44 which is pivoted in the housing to be turned in an anticlockwise direction by increasing $P_1$ and in a clockwise direction by increasing $P_4$. The throttle link 26 has on its end, which is inside the chamber 28, a roller unit 45 which is interposed between the levers 43 and 44. This arrangement is such that the lever 44 will be in equilibrium for a different value of $P_4:P_1$ for each different position of the throttle link 26.

The lever 44 has at its end remote from the bellows 41 a blade which controls an orifice 46 opening into a chamber 47 connected by a passage 48 to the low pressure side of piston 37. A drilling 49 extends between the orifice 46 and an orifice so connected via the orifice 40 to the high pressure fuel line 14. A branch passage 51 opens into the drilling 49 and this passage 51 is connected to the piston/cylinder unit 19 to urge the piston thereof against its spring loading. A passage 52 connects the chamber 47 to the unit 19 on the opposite side of the piston thereof.

Thus, the pressure difference across the piston of unit 19 is dependent upon two separate factors, namely the relationship of $P_3$ and $P_4$, which causes variation of the fuel pressure between the orifices 40 and 50, and the relationship between $P_1$ and $P_4$ in relation to the setting of the throttle link 26, which causes variation of the flow through the orifice 46, an increase in pressure in passage 51 resulting in an increase in fuel flow to the engine. In steady running conditions the latter relationship is most significant in controlling the fuel flow to the engine so that there will be a specific engine running speed (at any given altitude) for each setting of the throttle link. During rapid acceleration the lever 44 engages a stop 53 and control of fuel flow is then exercised in accordance with the former relationship until the $P_4:P_1$ ratio becomes sufficiently high to restore the lever 44 to equilibrium. Similarly, during deceleration the lever 44 engages a stop 54.

The pressure sensitive cells 29, 30, 41 and 42 have been referred to in the above description as bellows. It will be appreciated, however, that diaphragm units, or piston and cylinder units with low friction seals, could be used equally.

Having thus described my invention what I claim as new and desire to secure by Letters Patent is:

1. A fluid pressure actuated device for incorporation in a gas turbine engine fuel control system, the said device comprising a housing, a chamber within the housing, first and second pressure sensing cells in said chamber, each of which cells is contractible by increase of a first air pressure signal applied to the interior of the chamber, the first cell having an inlet whereby a second air pressure signal can be applied to its interior and having one of its ends fixed within the housing, and the interior of the second cell being evacuated, a first lever in the housing pivotable about an axis at one of its ends, pivotal connections being formed between the other end of the first cell and the first lever and one end of the second cell and the first lever, said pivotal connections being arranged at spaced positions along the first lever, a second lever pivotally mounted at one of its ends within the chamber and pivotally connected to the other end of the second cell, a third lever pivotally mounted in the chamber, a link interconnecting the second and third levers, an abutment associated with the first lever arranged to engage the third lever when the ratio of the second air pressure signal to the first air pressure signal is in excess of a value determined by the geometry of the lever/link system and an abutment in the chamber engageable by the first lever when said ratio is below said value, whereby the torque applied to said third lever is a function of both pressure signals when said ratio exceeds said value and a function of said first pressure signal only when said ratio is below said value.

2. A device as claimed in claim 1 which includes first and second liquid flow restricting orifices connected in series, the effective area of the first orifice being variable in accordance with the torque applied to the said third lever, a restricted inlet for a fluid under pressure between the first and second orifices, an outlet for a fluid pressure signal on a side of the second orifice remote from the first orifice and a port for connection to a low pressure on a side of the first orifice remote from the inlet.

3. A device as claimied in claim 2 which includes a piston displaceable in one direction by the fluid pressure between said first and second orifices and in the opposite direction by movement of the third lever in response to increases in the second air pressure signal.

4. A device as claimed in claim 3 in which movement of the piston in the said one direction increases the effective area of the first orifice.

5. A device as claimed in claim 4 which includes a further chamber within the housing, third and fourth pressure sensing cells in the said further chamber, contractible by increase of a third air pressure signal applied to the interior of the further chamber, the third cell having an inlet whereby the said second air pressure signal can be applied to its interior, one end of both the third and fourth cells being fixed within the housing, and the interior of the fourth cell being evacuated, a fourth lever pivotal within the housing and pivotally connected to the other end of the third cell, a fifth lever pivoted about one of its ends within the housing and pivotally connected to the other end of the fourth cell and a member movable within the housing and providing a pivotal engagement between the fourth and fifth levers, the location of the said pivotal engagement being variable by movement of the member.

6. A device as claimed in claim 5 which includes a third fluid flow restricting orifice, one side of which communicates with the said fluid pressure signal outlet and whose effective area is variable by the fourth lever and a port on a side of the third orifice remote the said inlet for connection to a low pressure.

7. A device as claimed in claim 6 in which the port associated with the third flow restricting orifice communicates with the port associated with the first flow restricting orifice.

8. A device as claimed in claim 5 which includes means for limiting the travel of the fourth lever.

9. A fuel control system for a gas turbine engine including a compressor, the said control system comprising a fluid pressure actuated device as claimed in claim 2, a metering valve for the fuel and actuating means for the metering valve, said actuating means being responsive to a fluid pressure signal at said outlet of the device.

10. A fuel control system for a gas turbine engine including a compressor, said control system comprising a fluid pressure actuated device as claimed in claim 5, a metering valve for the fuel and actuating means for the metering valve, said actuating means being responsive to a fluid pressure signal at said outlet of the device, said system including a throttle control and the member pivotally engaging the fourth and fifth levers being operatively connected to said throttle control.

11. A fuel control system as claimed in claim 10 in which the air pressure signals applied to the pressure sensing cells are derived from the engine compressor.

12. A fuel control system as claimed in claim 11 in which the liquid applied to the inlet of the said device is a fuel for the engine.

* * * * *